United States Patent [19]

Pethers

[11] Patent Number: 4,971,472
[45] Date of Patent: Nov. 20, 1990

[54] PIVOT JOINT AND METHOD OF PRODUCING SUCH A PIVOT JOINT

[75] Inventor: Peter C. Pethers, London, England

[73] Assignee: Trico Products Corporation, Buffalo, N.Y.

[21] Appl. No.: 453,722

[22] Filed: Dec. 20, 1989

[30] Foreign Application Priority Data

Dec. 21, 1988 [GB] United Kingdom ............... 8829821

[51] Int. Cl.⁵ .................................................. F16B 1/00
[52] U.S. Cl. ........................................ 403/24; 403/79; 15/250.32
[58] Field of Search ................... 403/79, 363, 24; 15/250.32, 250.33, 250.35

[56] References Cited

U.S. PATENT DOCUMENTS 4,286,351  9/1981  Mower et al. ................ 403/79 X
4,675,934  6/1987  Palu ............................ 15/250.32 X Primary Examiner—Andrew V. Kundrat
Attorney, Agent, or Firm—Biebel, French & Nauman

[57] ABSTRACT

A pivot joint (1) comprises a first member (2) of generally channel section with diverging walls (4) at least in the region of the joint (1), a second member (3) to which the first member (2) is to be pivotally connected and which is adapted to lie at least partially within the first member (2) in the region of the joint (1) and which has divergent sides (5) in the same sense as the first member (2), at least in the region of the joint (1) and a joint body (10) of channel shape with substantially parallel sides (14,15) prior to assembly. First attachment means (6) are provided on the first member (2) for cooperation with first attachment means (11) on the joint body (10) and second attachment means (7) are provided on the second member (3) for cooperation with second attachment means (12) on the joint body (10). The arrangement is such that in a method where the joint body (10) is pushed into the first member (2) and onto the second member (3), the parallel sides (14,15) of the joint body (10) are splayed outwardly and engagement between the first attachment means (6,11) and the second attachment means (7,12) is achieved, at least one of the attachment means (b 6,7,11,12) being so constructed as to allow at least limited pivotal motion between the associated member (2,3) and the joint body (10).

8 Claims, 1 Drawing Sheet

PIVOT JOINT AND METHOD OF PRODUCING SUCH A PIVOT JOINT

This invention relates to a pivot joint which is particularly but not exclusively useful in the manufacture of windscreen wipers and to a method of producing such a pivot joint.

In the manufacture of windscreen wipers, a number of pivot joints are used, particularly between the arm and blade and between the various yokes and/or levers of the blade itself.

Problems exist in the manufacture of windscreen wipers due to the necessity, very often, of pivoting metal parts together. These tend to be noisy and have a tendency to suffer from wear and corrosion. Various proposals have been made for overcoming these problems, for example, by the provision of plastics members between the metal of the joints, but these have not proved entirely satisfactory from a manufacturing standpoint although they have worked satisfactorily in practice.

In particular, problems have been caused by the necessity, during manufacture, to insert pivot pins into the joints, thus increasing the manufacturing costs and the number of parts involved. One proposal to overcome this resided in the provision of molded on trunnions to replace the pivot pins. This, however, gave problems in assembly since the outer member of the joint could no longer be slid over the inner member and had to be folded around it. In some circumstances, this caused overstressing of the material of the outer member resulting in damage to the surface treatment thereof and giving rise to corrosion problems.

The present invention seeks to provide a pivot joint and a method making such a pivot joint in which some or all of the above problems are reduced or substantially obviated.

According to a first aspect of the invention, there is provided a pivot joint comprising a first member of generally channel section with diverging walls at least in the region of the joint, a second member to which the first member is to pivotally connected and which is adapted to lie at least partially within the first member in the region of the joint and which has divergent sides in the same sense as the first member, at least in the region of the joint and a joint body of channel shape with substantially parallel sides prior to assembly, first attachment means on the said first member for cooperation with first attachment means on the joint body, second attachment means on the second member for cooperation with second attachment means on the joint body, the arrangement being such that when the joint body is pushed into the first member and onto the second member, the parallel sides of the joint body are splayed outwardly and engagement between the first attachment means and the second attachment means is achieved, at least one of the attachment means being so constructed as to allow at least limited pivotal motion between the associated member and the joint body.

Preferably at least one of the attachment means comprise trunnions on the associated member or the joint body and cooperating apertures in the associated joint body or member respectively whereby pivotal movement is provided between the joint body and the said associated member.

According to a second aspect of the invention, there is provided a method of making a pivot joint between a first member of generally channel section with diverging walls at least in the region of the joint and second member to which the first member is to be pivotally connected and which is adapted to lie at least partially within the first member in the region of the joint and which has divergent sides in the same sense as the first member, at least in the region of the joint, the method comprising taking a joint body of channel shape with substantially parallel sides, with first attachment means for cooperation with first attachment means on the first member and with second attachment means for cooperation with second attachment means on the second member, pushing the joint body into the channel of the first member and onto the second member whereby the parallel sides of the joint body are splayed outwardly and engagement between the first attachment means and the second attachment means is achieved, at least one of the attachment means being so constructed as to allow at least limited pivotal motion between the associated member and the joint body.

Preferably the joint body is first pushed into the first member and is thereafter pushed onto the second member.

The invention will now be described in greater detail, by way of example, with reference to the drawings, in which.

Figure 1:
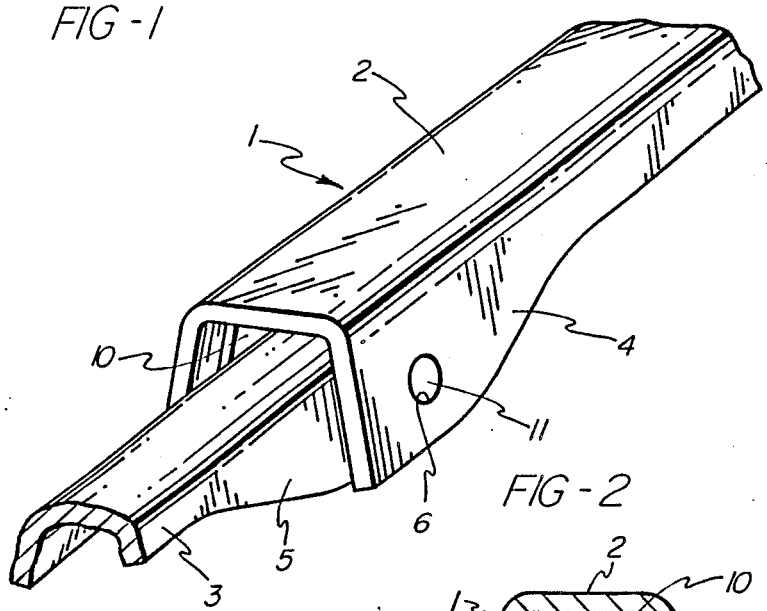
FIG. 1 is a perspective view of one form of joint in accordance with the invention.
Figure 2:
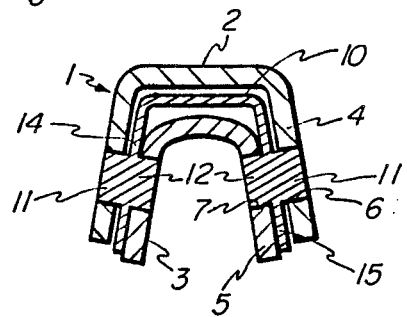
FIG. 2 is a transverse section of the joint of FIG. 1.

Referring firstly to FIGS. 1 and 2, there is shown one form of joint 1 in accordance with the invention which is depicted as applied to a joint between two metal yokes or levers of the harness of the blade of a windscreen wiper. In this a first or main yoke is indicated at 2 and the second or subsidiary yoke is indicated at 3. As can be seen, both yokes 2 and 3 are of channel section at the joint 1 and have their channel sides 4 and 5 splayed outwardly by an angle suitable to the air flow characteristics of the blade, in the embodiment shown of the order of 12°. On the pivot axis, both yokes 2 and 3 are provided with a pair of circular apertures 6 and 7 respectively.

The pivot joint 1 is completed by the provision of a plastics joint body 10 which is also of channel section. Exterior cylindrical trunnions 11 and interior cylindrical trunnions 12 are formed on the side walls 14 and 15 of the joint body 10 and these are all coaxial and coaxial with the apertures 6 and 7 on the yokes 2 and 3 when assembled. As can be seen, the trunnions 11 are inserted in the apertures 6 and the trunnions 12 are inserted in the apertures 7. Since the trunnions 11 and 12 and the apertures 6 and 7 are circular, pivoting can be achieved between the yoke 2 and the joint body 10 and between the joint body 10 and the yoke 3. In this way, pivotal motion between the two yokes 2 and 3 is achieved.

In practice, only pivotal motion between one of the yokes and the joint body is needed to provide the necessary pivoting. Thus one of the pivots may be restrained, either intentionally or by the inherent shapes of the various parts.

The assembly of the joint will now be described with particular reference to FIGS. 2 and 3. From these figures it will be seen that, prior to assembly, only the metal yokes 2 and 3 have splayed channels while the sides 14 and 15 of the joint body 10 are, substantially at least, parallel.

In the first assembly operation, the joint body 10 is offered up to the first or main yoke 2 and pressed into it. Due to the material of which the joint body is made, the sides 14 and 15 thereof can flex slightly inwardly allowing the trunnions 11 to slightly enter the apertures 6, depending on the exact dimensions used, it may not be necessary to have any flexing of the side walls 14 and 15 of the joint body 10 since it is not essential for the lower edge of the trunnions 11 to enter into the apertures 6. However, it may be preferable for them to do so as this provides for the joint body to be positively located in the yoke 2 and will prevent the joint body from dropping out if it is not supported prior to the second stage of assembly.

Figure 3:
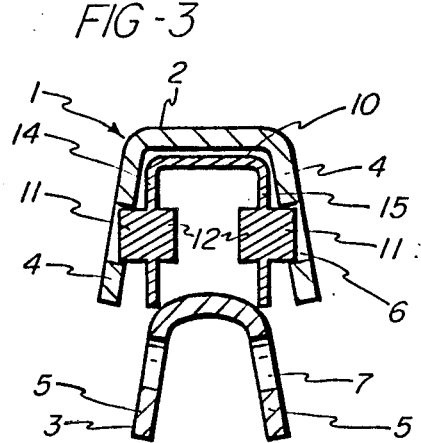
FIG. 3 is a sectional view of the parts of the joint in a first stage of assembly.

In the second assembly operation, which takes the joint from the position seen in FIG. 3 to the position shown in FIG. 2, the second or subsidiary yoke 3 is pushed upwardly into the joint body. Due to the splayed nature of the sides 5 of the yoke 3, the sides of the joint body will be forced apart so that the trunnions 12 can pass down the sides 5 of the yoke 3 until they reach a position in which they can snap into the apertures 7 therein. During this time, the trunnions 11 on the exterior of the joint body 10 are pushed outwardly through the apertures 6 in the main yoke 2. Once the trunnions 12 have snapped into the apertures 7 of the second yoke, the trunnions 11 will be drawn into the apertures 6 of the first yoke 2 so that their outer surfaces lie flush with the wall of the yoke 2. The joint is then completed and has the configuration shown in FIG. 2.

From the foregoing, it will be seen that the above described joint and its method of assembly are well adapted to automation of assembly, requiring a minimum of operations which are all straightforward.

It will be appreciated that modifications or alterations may be made to the above described embodiment without departing from the scope of the invention. For example, the assembly method could be reversed, with suitably dimensioned parts so that the joint body could first be pushed onto the second yoke 3, the second yoke 3 together with the joint body 10 could then be pushed into the main yoke 2.

While, from a manufacturing standpoint, it is preferable to have the trunnions on the joint body, it would be possible to provide one or both pairs of trunnions on the yokes and to provide the joint body with holes or recesses.

I claim:

1. A pivot joint comprising a first member of generally channel section with diverging walls at least in the region of the joint, a second member to which the first member is to be pivotally connected and which is adapted to lie at least partially within the first member in the region of the joint and which has divergent sides in the same sense as the first member, at least in the region of the joint and a joint body of channel shape with substantially parallel sides prior to assembly, first attachment means on the said first member for cooperation with first attachment means on the joint body, second attachment means on the second member for cooperation with second attachment means or the joint body, the arrangement being such that when the joint body is pushed into the first member and onto the second member, the parallel sides of the joint body are splayed outwardly and engagement between the first attachment means and the second attachment means is achieved, at least one of the attachment means being so constructed as to allow at least limited pivotal motion between the associated member and the joint body.

2. A pivot joint as claimed in claim 1, wherein at least one of the attachment means comprise trunnions on the associated member or the joint body and cooperating apertures in the associated joint body or member respectively whereby pivotal movement is provided between the joint body and the said associated member.

3. A pivot joint as claimed in claim 2, wherein both attachment means comprise trunnions provided on the joint body which cooperate with apertures in both first and second members.

4. A pivot joint as claimed in claim 3, wherein the axes of the trunnions and the apertures in the first and second members lie on the same line.

5. A pivot joint as claimed in claim 1, wherein the first and second members comprise yokes or levers of a windscreen wiper blade.

6. A method of making a pivot joint between a first member of generally channel section with diverging walls at least in the region of the joint and a second member to which the first member is to be pivotally connected and which is adapted to lie at least partially within the first member in the region of the joint and which has divergent sides in the same sense as the first member, at least in the region of the joint, the method comprising taking a joint body of channel shape with substantially parallel sides, with first attachment means for cooperation with first attachment means on the first member and with second attachment means for cooperation with second attachment means on the second member, pushing the joint body into the channel of the first member and onto the second member whereby the parallel sides of the joint body are splayed outwardly and engagement between the first attachment means and the second attachment means is achieved, at least one of the attachment means being so constructed as to allow at least limited pivotal motion between the associated member and the joint body.

7. A method of making a pivot joint as claimed in claim 6, wherein the joint body is first pushed into the first member and is thereafter pushed onto the second member.

8. A method of making a pivot joint as claimed in claim 6, wherein the first and second members comprise yokes or levers of a windscreen wiper blade.

* * * * *

REEXAMINATION CERTIFICATE (2838th)

United States Patent [19]

Pethers

[11] B1 4,971,472

[45] Certificate Issued Apr. 9, 1996

[54] PIVOT JOINT AND METHOD OF PRODUCING SUCH A PIVOT JOINT

[75] Inventor: Peter C. Pethers, London, England

[73] Assignee: Trico Products Corporation, Buffalo, N.Y.

Reexamination Request:
No. 90/003,845, May 30, 1995

Reexamination Certificate for:
Patent No.: 4,971,472
Issued: Nov. 20, 1990
Appl. No.: 453,722
Filed: Dec. 20, 1989

[30] Foreign Application Priority Data

Dec. 21, 1988 [GB] United Kingdom .................. 8829821

[51] Int. Cl.⁶ ........................................................ F16B 1/00
[52] U.S. Cl. ........................... 403/24; 403/79; 15/250.32
[58] Field of Search ........................... 403/24, 79, 363; 15/250.32, 250.33, 250.35

[56] References Cited

U.S. PATENT DOCUMENTS 4,009,504  3/1977  Arman .
4,286,351  9/1981  Mower et al. ................. 15/250.42
4,793,020  12/1988  Stratton et al. .

FOREIGN PATENT DOCUMENTS 2336071  2/1974  Germany .

*Primary Examiner*—Anthony Knight

[57] ABSTRACT

A pivot joint (1) comprises a first member (2) of generally channel section with diverging walls (4) at least in the region of the joint (1), a second member (3) to which the first member (2) is to be pivotally connected and which is adapted to lie at least partially within the first member (2) in the region of the joint (1) and which has divergent sides (5) in the same sense as the first member (2), at least in the region of the joint (1) and a joint body (10) of channel shape with substantially parallel sides (14,15) prior to assembly. First attachment means (6) are provided on the first member (2) for cooperation with first attachment means (11) on the joint body (10) and second attachment means (7) are provided on the second member (3) for cooperation with second attachment means (12) on the joint body (10). The arrangement is such that in a method where the joint body (10) is pushed into the first member (2) and onto the second member (3), the parallel sides (14,15) of the joint body (10) are splayed outwardly and engagement between the first attachment means (6,11) and the second attachment means (7,12) is achieved, at least one of the attachment means (b 6,7,11,12) being so constructed as to allow at least limited pivotal motion between the associated member (2,3) and the joint body (10).

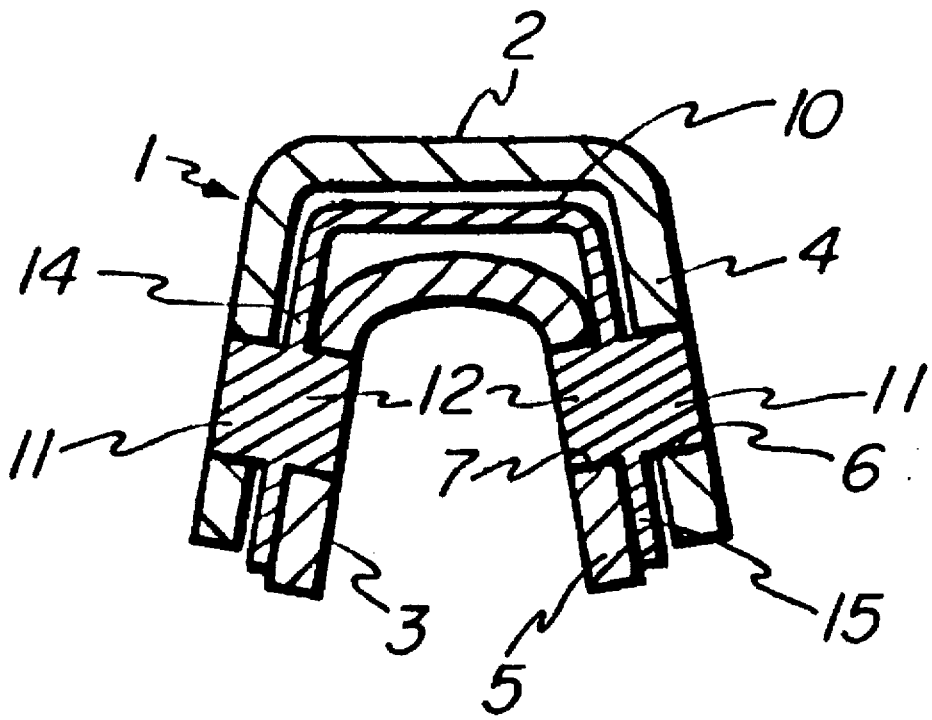

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 6–8 is confirmed.

Claims 1–5 are cancelled.

* * * * *